United States Patent
Lynga et al.

(10) Patent No.: US 10,413,875 B2
(45) Date of Patent: Sep. 17, 2019

(54) METHOD AND AN ARRANGEMENT IN A FLOW SYSTEM

(71) Applicant: GE Healthcare Bio-Sciences AB, Uppsala (SE)

(72) Inventors: Jan-Erik Pettersson Lynga, Uppsala (SE); Asa Dahlstedt Hagman, Uppsala (SE)

(73) Assignee: GE HEALTHCARE BIO-SCIENCES AB, Uppsala (SE)

( * ) Notice: Subject to any disclaimer, the term of this patent is extended or adjusted under 35 U.S.C. 154(b) by 111 days.

(21) Appl. No.: 15/426,618

(22) Filed: Feb. 7, 2017

(65) Prior Publication Data

US 2017/0225135 A1 Aug. 10, 2017

(30) Foreign Application Priority Data

Feb. 9, 2016 (GB) .................... 1602300.4

(51) Int. Cl.
| | | |
|---|---|---|
| *B01F 15/00* | (2006.01) | |
| *B01F 3/08* | (2006.01) | |
| *B01F 15/02* | (2006.01) | |
| *G05D 7/06* | (2006.01) | |
| *B01D 15/16* | (2006.01) | |

(52) U.S. Cl.
CPC ...... *B01F 15/00285* (2013.01); *B01F 3/0861* (2013.01); *B01F 15/0243* (2013.01); *G05D 7/0682* (2013.01); *B01D 15/166* (2013.01)

(58) Field of Classification Search
CPC .............. B01F 15/00285; B01F 3/0861; B01F 15/0243; G05D 7/0682; B01D 15/166
See application file for complete search history.

(56) References Cited

U.S. PATENT DOCUMENTS

| | | | |
|---|---|---|---|
| 4,511,311 A | 4/1985 | Olson | |
| 4,897,022 A * | 1/1990 | Hudson | E03B 5/02 |
| | | | 417/540 |
| 5,720,598 A | 2/1998 | De Chizzelle | |
| 2014/0169984 A1 | 6/2014 | Coin | |

FOREIGN PATENT DOCUMENTS

| | | |
|---|---|---|
| CN | 203130463 U | 8/2013 |
| KR | 101183907 B | 9/2012 |
| KR | 101370026 B | 3/2014 |
| KR | 101609236 B | 4/2016 |

OTHER PUBLICATIONS

GB Search Report regarding GB Application No. 1602300.4, dated Jul. 11, 2016, 4 pages.

* cited by examiner

*Primary Examiner* — Anshu Bhatia
(74) *Attorney, Agent, or Firm* — Wood IP LLC

(57) ABSTRACT

An arrangement for adding a first fluid component into a flow system, said arrangement comprising:
a first pump provided in a first component adding fluid line which is connecting a first system fluid line of the flow system with a first fluid component source comprising the first fluid component to be added into the flow system; and
a second pump provided in a second component adding fluid line connected in parallel with the first component adding fluid line, said second component adding fluid line connecting the first system fluid line of the flow system with a first fluid component source comprising the first fluid component to be added into the flow system.

4 Claims, 2 Drawing Sheets

METHOD AND AN ARRANGEMENT IN A FLOW SYSTEM

CROSS-REFERENCE TO RELATED APPLICATIONS

This application claims priority to GB application number 1602300.4, filed Feb. 9, 2016, the entire disclosures of each of which are hereby incorporated by reference.

TECHNICAL FIELD OF THE INVENTION

The present invention relates to a method and an arrangement for adding a first fluid component into a flow system.

BACKGROUND OF THE INVENTION

When adding a component to a flow system a pump is normally used. The size of the pump can be chosen for the specific purpose. Often the flow of the component into the flow system can then be regulated by regulating the flow rate of the pump.

Problems in such flow systems may be related to limitations in flow capacity and limitations in precision when adjusting flow.

SUMMARY

An object of the invention is to provide a flow system and a method in a flow system for the adding of a fluid component into the system with improved precision and flexibility.

This is achieved in a method and an arrangement for adding a first fluid component into a flow system. The arrangement comprises a first pump provided in a first component adding fluid line which is connecting a first system fluid line of the flow system with a first fluid component source comprising the first fluid component to be added into the flow system and a second pump provided in a second component adding fluid line connected in parallel with the first component adding fluid line, said second component adding fluid line connecting the first system fluid line of the flow system with a first fluid component source comprising the first fluid component to be added into the flow system.

By running two pumps in parallel like this one of the pumps can be used as a support pump and be kept at constant flow rate and the other can be used for regulating the flow. If a large pump capacity is needed it is an advantage that the regulation can be done in a smaller pump because of better precision in the regulation. It is easier to adjust and control a flow rate with precision for a pump working at a lower flow rate than a higher flow rate. Furthermore, the use of two pumps in parallel enables the use of a broader flow range and it can be avoided to work close to the upper and lower flow rate limits of each pump. This can increase the life time of the pumps. A system using two pumps for the same fluid component to be added will give enhanced flexibility with regard to possible flow range and precision in regulation. Furthermore the possibility to combine pumps of different sizes will increase flexibility of the system.

Different embodiments of the invention are described in the dependent claims.

For example the method comprises in one embodiment detecting a condition in the flow in the flow system and regulating one or both of the first and second pumps in dependence of said detected condition.

Furthermore, in one embodiment of the invention the method is a method for inline blending of fluid components to a blended solution to be added into a flow system, wherein one of the fluid components is the first fluid component which is provided through two parallel component adding fluid lines, being the first component adding fluid line and the second component adding fluid line.

DETAILED DESCRIPTION OF THE EMBODIMENTS

Figure 1:
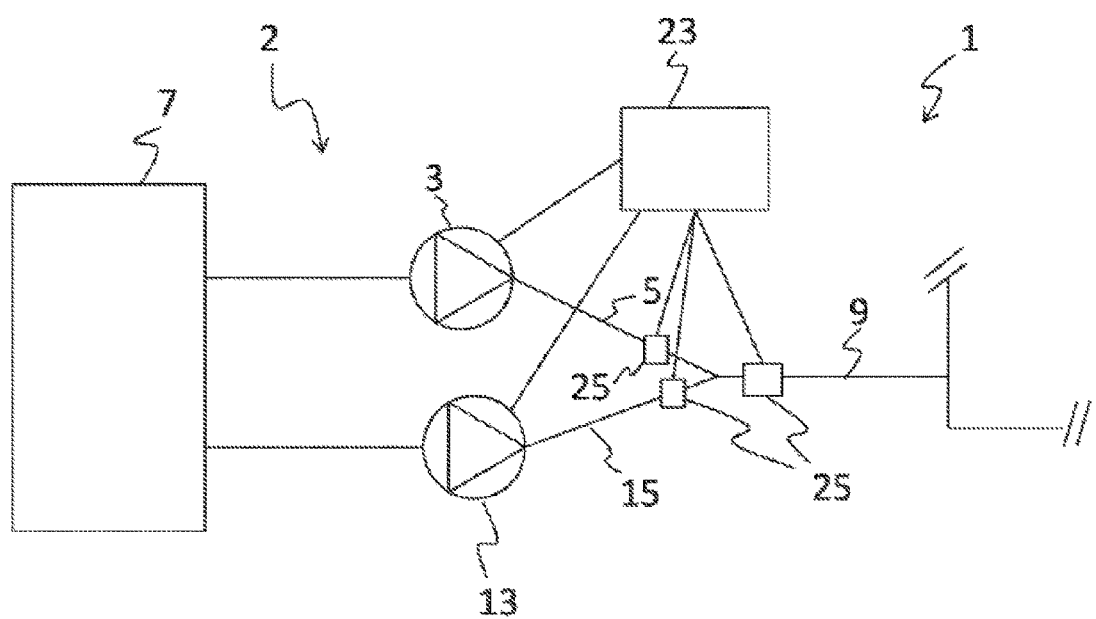
FIG. 1 shows schematically a flow system according to one embodiment of the invention.

FIG. 1 shows schematically a part of a flow system 1 according to one embodiment of the invention. The flow system could be a system for inline blending of fluid components, for example inline blending of a buffer. The flow system could also be for example a chromatography system, a continuous chromatography system or a filtration system. The system for inline blending of fluid components could also be a part of a larger flow system such as a chromatography system. The inline blending of a buffer could also be called for example inline conditioning or inline dilution. In FIG. 1 the flow system 1 is only shown in part. According to the invention the flow system comprises an arrangement 2 for adding a first fluid component into the flow system 1. This arrangement 2 for adding a first fluid component comprises according to the invention at least two pumps provided in parallel and both connected to a first fluid component source 7 (this could be one source or two separate sources containing the same first fluid). In the embodiment shown in FIG. 1 the arrangement 2 comprises a first pump 3 provided in a first component adding fluid line 5 and a second pump 13 provided in a second component adding fluid line 15 which is parallel to the first component adding fluid line 5. The first and second component adding fluid lines 5, 15 are both connected to the first fluid component source 7 comprising the first fluid component. Alternatively the two component adding fluid lines could be connected to two separate sources but in that case both sources should contain the same first fluid component. The other ends of the first and second component adding fluid lines 5, 15 are connected to a first system fluid line 9 which is connected to the rest of the flow system 1.

Pumps can normally be regulated with regard to flow rate. According to one embodiment of the invention one of the first pump 3 or the second pump 5 is kept at a constant flow rate while the total flow of the first fluid component into the first system fluid line 9 is regulated by regulating the other of the first or second pumps.

According to another embodiment of the invention both pumps can be regulated independently for regulating the total flow of the first fluid component into the flow system 1.

According to one embodiment of the invention one of the first or second pumps 3, 5 is larger than the other, for example having a larger volumetric capacity. The difference in size between the two pumps can be chosen differently but could for example be that the larger pump has 25% larger volumetric capacity than the smaller pump. One of the pumps can be kept at constant flow rate. In this embodiment the total flow of the first fluid component into the first system fluid line 9 is regulated by regulating one of the first or second pumps, suitably the smallest of the two pumps if a small adjustment of the flow is wanted and the larger of the pumps if a large adjustment of the flow is wanted.

By running two pumps in parallel one can be used as a support pump and be kept at constant flow rate and the other can be used for regulating the flow. If a large pump capacity is needed it is an advantage that the regulation can be done in a smaller pump because of better precision in the regulation. It is easier to adjust and control a flow rate with precision for a pump working at a lower flow rate than a higher flow rate. Furthermore, the use of two pumps in parallel enables the use of a broader flow range and it can be avoided to work close to the upper or lower flow rate limit of each pump. This can increase the life time of the pumps. A system using two or more pumps for the same fluid component to be added will give enhanced flexibility with regard to possible flow range and precision in regulation. Furthermore the possibility to combine pumps of different sizes will increase flexibility of the system.

In one embodiment of the invention a control system 23 is further provided for regulating the pumps. The control system 23 is connected, by cable or wirelessly, to one or more of the pumps 3, 13. Through the control system 23 the flow rates of one or more of the pumps can be regulated. For example both the first pump 3 and the second pump 13 can be regulated for achieving a wanted total flow rate of the first fluid component into the flow system 1. In another embodiment one of the first or second pumps 3, 13 is being kept at constant flow rate while the other pump can be regulated from the control system 23. If small adjustments to the flow rate are wanted it can be an advantage to regulate the one of the two pumps being the smallest.

The control system 23 is possibly also connected, by cable or wirelessly, to one or more sensors 25 provided in either the first and/or second component adding fluid lines 5, 15 or in the first system fluid line 9 or in both. A feedback from sensors 25 to the control system 23 can further improve the accuracy in pump flow rate regulation. The sensors could be measuring for example pH, conductivity, UV, NIR, RI, density or flow.

Figure 2:
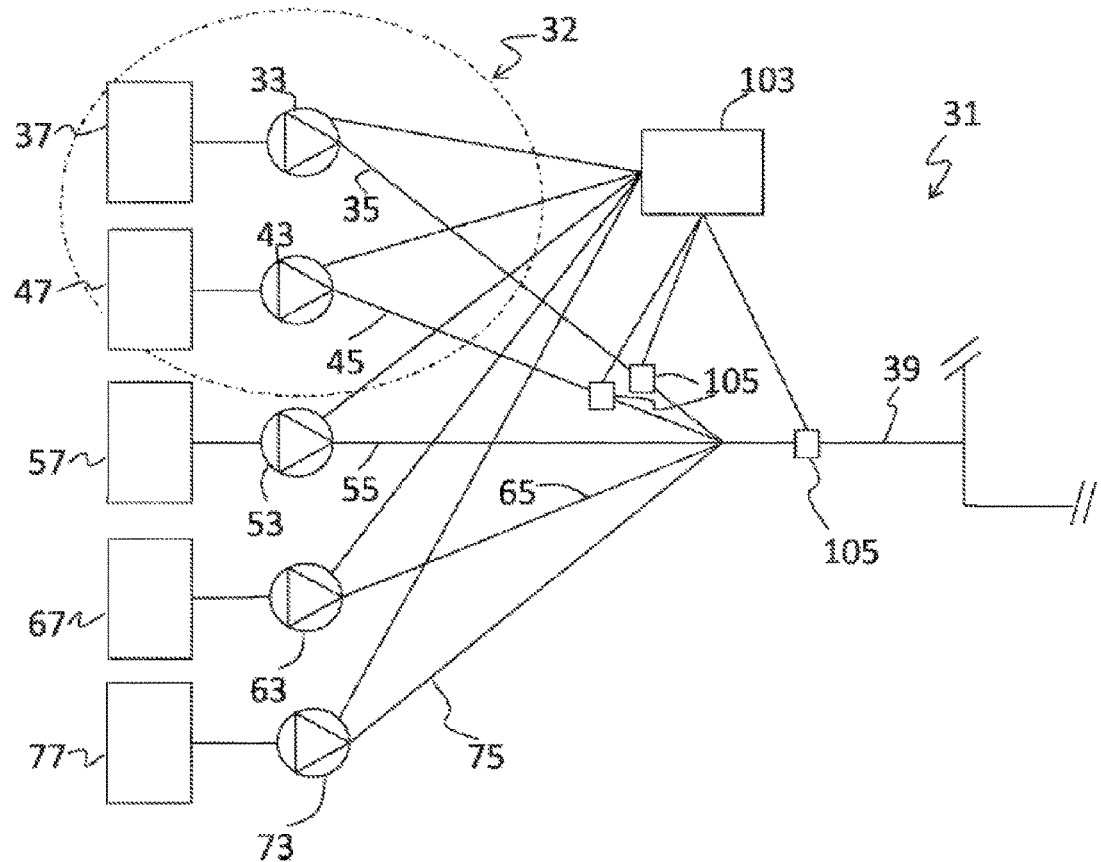
FIG. 2 shows schematically a flow system according to one embodiment of the invention comprising a function for inline blending of fluid components.

FIG. 2 shows schematically a flow system 31 according to one embodiment of the invention comprising a function for inline blending of fluid components. According to this embodiment of the invention a first pump 33 is provided in a first component adding fluid line 35. Said first component adding fluid line 35 is connected in one end to a first fluid component source 37 comprising the first fluid component. The other end of the first component adding line 35 is connected to a first system fluid line 39 which in turn is connected to the rest of the fluid system 31. A second pump 43 is provided in a second component adding fluid line 45. Said second component adding fluid line 45 is provided in parallel with the first component adding fluid line 35. The second component adding fluid line 45 is connected in one end to a first fluid component source 47 comprising the first fluid component. This could be the same as the first fluid component source 37 to which the first component adding fluid line 35 is connected or another source. However the fluid component comprised in the two first fluid component sources 37, 47 is the same and called the first fluid component according to the invention. The other end of the second component adding fluid line 45 is connected to the first system fluid line 39. According to this embodiment of the invention at least one other fluid component is also added to a blended fluid provided into the first system fluid line 39.

In this embodiment three more pumps 53, 63, 73 and fluid component sources 57, 67, 77 are shown provided in additional component adding fluid lines 55, 65, 75 provided in parallel to the first and second component adding fluid lines 35, 45 but the number can be varied. Fluid components of a buffer to be provided into the fluid system 31 could hereby be blended in the system. The fluid components could for example be acid, base, water, salt or other additives of chemical compounds such as detergents, solvents, trace compounds, metal ions or nutrients. Alternatively one fluid component could be buffer and the other water. This could be called an inline dilution system. In that case the first fluid component would be the buffer and therefore provided from the first fluid component sources 37, 47 through the first and second component adding fluid lines. In that case only three pumps and component adding fluid lines are provided where the fluid component source 57 connected to the third component adding fluid line 55 would contain water.

According to the invention the first and second pumps 33, 43 are regulated as described above, i.e. one can be kept at constant flow and the other can be regulated or both can be regulated. Furthermore one of the first and second pumps 33, 43 can have a larger flow rate capacity than the other. The regulation is suitably performed from a control system 103 connected, by cable or wirelessly, to some or all of the pumps.

The control system 103 can also in one embodiment of the invention be connected by cable or wirelessly, to one or more sensors 105 provided in either the first system fluid line 39 and/or in one or more of the component adding fluid lines 35, 45, 55, 65, 75. The flow rate of the pumps 33, 43, 53, 63, 73 can be regulated in dependence of sensor output received in the control system 103. The sensors can measure for example pH, conductivity, UV, NIR, RI, density or flow as described above.

Additional sensors can also be provided in the system for independent monitoring of different factors.

The invention claimed is:

1. A method for adding a first fluid component into a flow system, comprising the steps of:
   i) providing:
      a) a first pump in connection with a first component adding fluid line;
      b) a second pump in connection with a second component fluid line;
      c) a fluid component source, comprising a fluid component to be added into the flow system; and
      d) a system fluid line;
   ii) connecting a first end of the first component adding fluid line to the system fluid line;
   iii) connecting a second end of the first component adding fluid line to the fluid component source via the first pump;
   iv) connecting a first end of the second component adding fluid line to the system fluid line; and
   v) connecting a second end of the second component adding fluid line to the fluid component source via the second pump; and
   vi) keeping one of the first pump or the second pump at a constant flow rate and regulating the total flow of the fluid component into the system fluid line regulating the other of the first or second pump;
   wherein one of the first or second pumps is larger than the other and kept at constant flow rate; and
   wherein, flow of a fluid from the fluid component source via second pump is parallel with flow of the fluid from the fluid component source via the first pump.

2. The method according to claim 1, further comprising regulating the total flow of the fluid component into first system fluid line regulating the one of the first or second pumps being the smallest pump.

3. The method according to claim 1, further comprising detecting a condition in the flow in the flow system and regulating one or both of the first and second pumps in dependence of said detected condition.

4. The method according to claim 3, wherein the method is a method for inline blending of a plurality of fluid components to a blended solution to be added into a flow system, wherein one of the fluid components is the fluid component which is provided through two parallel component adding fluid lines, being the first component adding fluid line and the second component adding fluid line.

* * * * *